US009973588B2

(12) United States Patent
Vyrros et al.

(10) Patent No.: US 9,973,588 B2
(45) Date of Patent: *May 15, 2018

(54) MANAGING NOTIFICATIONS ACROSS MULTIPLE DEVICES

(71) Applicant: Apple Inc., Cupertino, CA (US)

(72) Inventors: Andrew H. Vyrros, San Francisco, CA (US); Matthew Elliott Shepherd, Mountain View, CA (US); Dylan Ross Edwards, San Jose, CA (US); Justin Wood, Sunnyvale, CA (US); Daniel Ben Pollack, San Francisco, CA (US); Pierre de Filippis, San Jose, CA (US); Jonathan Drummond, Sunnyvale, CA (US); Justin Santamaria, San Francisco, CA (US); Greg Novick, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/069,872

(22) Filed: Mar. 14, 2016

(65) Prior Publication Data
US 2016/0337461 A1    Nov. 17, 2016

Related U.S. Application Data

(63) Continuation of application No. 13/913,322, filed on Jun. 7, 2013, now Pat. No. 9,288,164.

(51) Int. Cl.
| G06F 15/16 | (2006.01) |
| H04L 29/08 | (2006.01) |
| H04L 12/58 | (2006.01) |
| H04W 12/02 | (2009.01) |
| H04W 12/10 | (2009.01) |
| H04W 4/12 | (2009.01) |
| H04L 9/30 | (2006.01) |

(Continued)

(52) U.S. Cl.
CPC ............... *H04L 67/26* (2013.01); *H04L 9/30* (2013.01); *H04L 51/24* (2013.01); *H04L 63/0428* (2013.01); *H04L 67/20* (2013.01); *H04W 4/12* (2013.01); *H04W 12/02* (2013.01); *H04W 12/10* (2013.01); *H04W 12/06* (2013.01)

(58) Field of Classification Search
None
See application file for complete search history.

(56) References Cited

U.S. PATENT DOCUMENTS

| 7,475,395 B2 | 1/2009 | Etelapera |
| 7,839,723 B2 | 11/2010 | Adams |

(Continued)

OTHER PUBLICATIONS

"Here What's New in Notifications in iOS 6," iPhoneHacks, Sep. 20, 2012, 1 page, http://www.iphonehacks.com/2012/09/ios-6-notifications.html.

*Primary Examiner* — Brian Whipple
(74) *Attorney, Agent, or Firm* — Fish & Richardson P.C.

(57) ABSTRACT

Modifying a notification on one client device can trigger the generation and transmission of a silent notification to another client device that is associated with the same user account. The silent notification can include instructions to query for and modify a similar notification, if present, on the other client device. Silent notifications that are undeliverable can be stored in offline storage and delivery can be reattempted at a later point in time.

18 Claims, 10 Drawing Sheets

(51) Int. Cl.
*H04L 29/06* (2006.01)
*H04W 12/06* (2009.01)

(56) References Cited

U.S. PATENT DOCUMENTS

| | | |
|---|---|---|
| 7,925,990 B2 | 4/2011 | Bedingfield, Sr. |
| 8,099,669 B2 | 1/2012 | Nixon et al. |
| 2002/0160790 A1 | 10/2002 | Schwartz et al. |
| 2003/0023690 A1 | 1/2003 | Lohtia |
| 2003/0191807 A1 | 10/2003 | Olson |
| 2003/0195946 A1 | 10/2003 | Yang |
| 2004/0044583 A1 | 3/2004 | Thibault |
| 2007/0100951 A1 | 5/2007 | Bae |
| 2007/0239869 A1* | 10/2007 | Raghav ............ G06Q 10/10 709/224 |
| 2009/0234935 A1 | 9/2009 | Watson et al. |
| 2011/0289172 A1 | 11/2011 | Marcellino |
| 2012/0101818 A1 | 4/2012 | Scott et al. |
| 2014/0218563 A1 | 8/2014 | Sugimoto |
| 2014/0365569 A1 | 12/2014 | Vyrros et al. |
| 2014/0372555 A1 | 12/2014 | Brunsman et al. |
| 2015/0120849 A1 | 4/2015 | Thies et al. |
| 2015/0188871 A1 | 7/2015 | Lewis et al. |

\* cited by examiner

MANAGING NOTIFICATIONS ACROSS MULTIPLE DEVICES

CROSS-REFERENCE TO RELATED APPLICATION

This application is a continuation of and claims priority to U.S. patent application Ser. No. 13/913,322, filed Jun. 7, 2013, the entire contents of which are incorporated herein by reference.

TECHNICAL FIELD

The present technology pertains to notification management, and more specifically pertains to the management of notifications across multiple devices.

BACKGROUND

Recent advances in technology have led to the popularity of portable electronic devices such as smart phones, tablets, and portable PCs. Different devices vary in size and performance. As a result, consumers generally own more than one of these devices since in certain situations, one device can be preferred over another. The popularity of these devices has led to a rapid growth in the development of applications for these devices. The applications range from productivity applications for banking and news to entertainment applications for social media and entertainment.

Applications installed on a device can periodically receive updates from the application provider. For example, a news application can frequently receive updated content from a news agency. As another example, a banking application can receive updates related to changes to a customer's bank account such as deposits, withdrawals, or new offers. These updates can be presented to the user as a notification on the device.

Due to the nature of notifications, having multiple devices does present some challenges. For example when a user owns multiple devices that each have a copy of an application installed, notifications related to the application can be received and presented on each of the user's devices. A notification which has been reviewed on one device can still be present on another user device. Hence, a significant amount of time and effort is required to review notifications received on the user's devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing notifications across multiple devices. In one embodiment, modifying notifications of a first client device can result in the same modification being performed on an equivalent notification of a second client device. Modification can include dismissing the notification, dismissing an alert corresponding to the notification, or modifying/updating the contents of the notification. When a notification has been modified on a first client device, the first client device can perform a query for other client device(s). The other client device(s) and the first client device can belong to a group of devices that are associated with a user account. Once the other client device(s) are identified, the first client device can transmit a silent notification to the other client device(s). Upon receiving the silent notification, the other client device(s) can determine whether a notification that is equivalent to the notification modified on the first client device exists. If an equivalent notification does exist, the other client device can perform the same modification to the equivalent notification. For example, a user dismissing an alert for a notification on a first client device can result in the dismissal of an alert for an equivalent notification on a second client device. This removes the necessity of reviewing equivalent notifications on different devices.

In another embodiment, a client device can communicate with an identity service to register the client device in a client device group table. Client devices that are registered can be returned in a query for client devices that are associated with a user account or handle.

In another embodiment, a system is configured to allow a first client device to transmit a silent notification to a second client device. The system can include an identify service, a push notification service, a transport service, an offline storage, or any combination of the above. In some configurations, the system can provide safeguards that ensure point to point communications between two client devices are authorized and protected.

In another embodiment, an undeliverable silent notification is saved in an offline storage. The silent notification can be undeliverable because of network error, receiving device power failure, or the receiving device is offline. When the receiving device is able to communicate with the system, another attempt can be made to transmit the silent notification to the client device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for systems, devices, techniques, and methods for managing notifications across multiple devices. Generally, a system can include a plurality of client devices, one or more servers configured to support native functionality of the client devices (e.g., making phone calls, downloading applications, etc.), and one or more servers configured to manage notifications generated for the client devices. A client device can receive notifications for various applications installed on the client device. Some of the notifications (such as notifications for messages or missed calls) can relate to the native functionality of the client device. These notifications can be generated from within the system. Other notifications can originate from third party sources that have an application installed on the client device. These notifications can be generated from outside the system and transmitted to the servers configured to manage notifications. The servers in turn route the notifications to their intended recipient.

A third party service can generate and transmit notifications to client devices that are identified in a user account of the third party service. For example, a user account of a social media service can request to have the social media service send notifications to a list of client devices. The third party service can generate a notification for each client device and transmit the notifications to the client devices. Each of the notifications can contain the same content but be uniquely identifiable. Since the notifications do not originate from within the system, a unique identifier may not exist to unify the notifications containing the same content. As such, other techniques are employed to match similar notifications.

Figure 1:
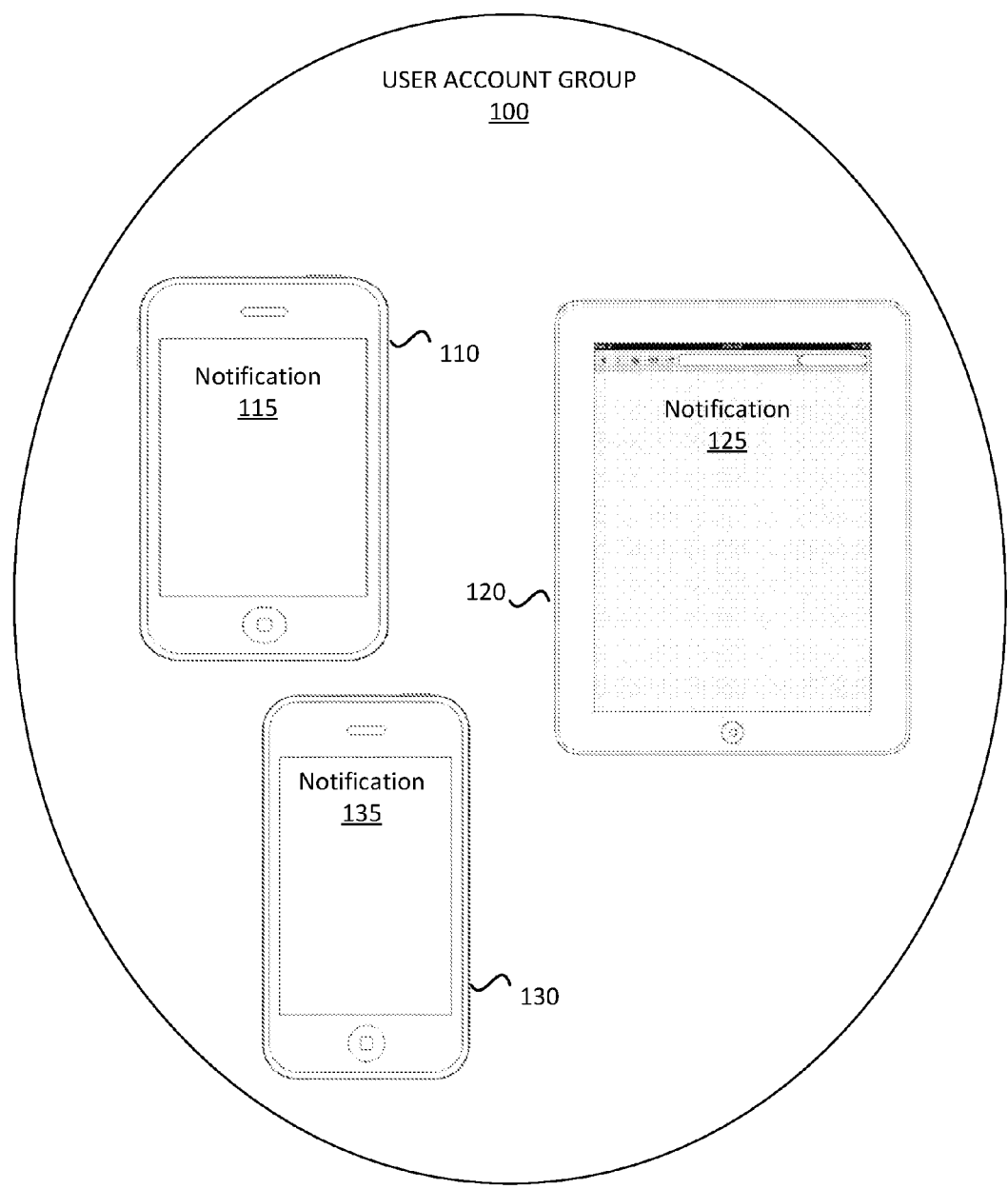
FIG. 1 illustrates an exemplary user account group.

FIG. 1 illustrates an exemplary user account group. User account group 100 includes three client devices: client device 110, client device 120, and client device 130. Each of these client devices, which can be the same or different type of device, can have a stored notification. For instance, client device 110 includes notification 115, client device 120 includes notification 125, and client device 130 includes notification 135. While each notification is uniquely generated and thus contains no metadata associating them with one another, the content in each notification can be the same. As such, the notifications are equivalent to one another even though they were separately transmitted. Equivalent notifications can contain the same content but be individually generated. In some examples, the notifications can also be originating from different sources or from a source outside of user account group 100.

In one embodiment, a user instruction or event is received on client device 110 to modify notification 115. The instruction or event can be to delete the notification, dismiss an alert associated with the notification, to change the contents of the notification, or to otherwise modify the notification. Client device 110 can process the user instruction or event, resulting in the modification of the notification. In some examples, processing can further include generating a silent notification. The silent notification can be configured to perform the same modification on an equivalent notification stored on other client devices of user account group 100. For example, if the user instruction is to dismiss an alert of notification 115 presented on a display of client device 110, the silent notification can be configured to dismiss an alert of an equivalent notification (e.g., notification 125 and/or notification 135) presented on a display of client device 120 and/or client device 130. The user instruction or event can be sliding to unlock a device while an alert of a notification is being presented on a display of client device 110, dismissing an alert of a notification that has popped up on the display of client device 110 while the device is in use, or deleting a notification from a notification center of client device 110.

The silent notification can be transmitted to other client devices in user account group 100. In one example, the transmission can be a point to point transmission. In another example, the transmission can be a broadcast that is received by the client devices in user account group 100. A client device that receives the silent notification can process the silent notification as an instruction to perform a query for a notification that is similar to notification 115. Querying for an equivalent notification can comprise text matching, keyword matching, metadata matching, or other techniques to match some or all of the content from notification 115. For example, client device 130 can identify notification 135 as being equivalent to notification 115 by matching portions of text within the content of the notifications. Once the match has been found, the client device can perform an action on the matched notification. In some examples, the action can be the same action that was performed on notification 115.

Figure 2:
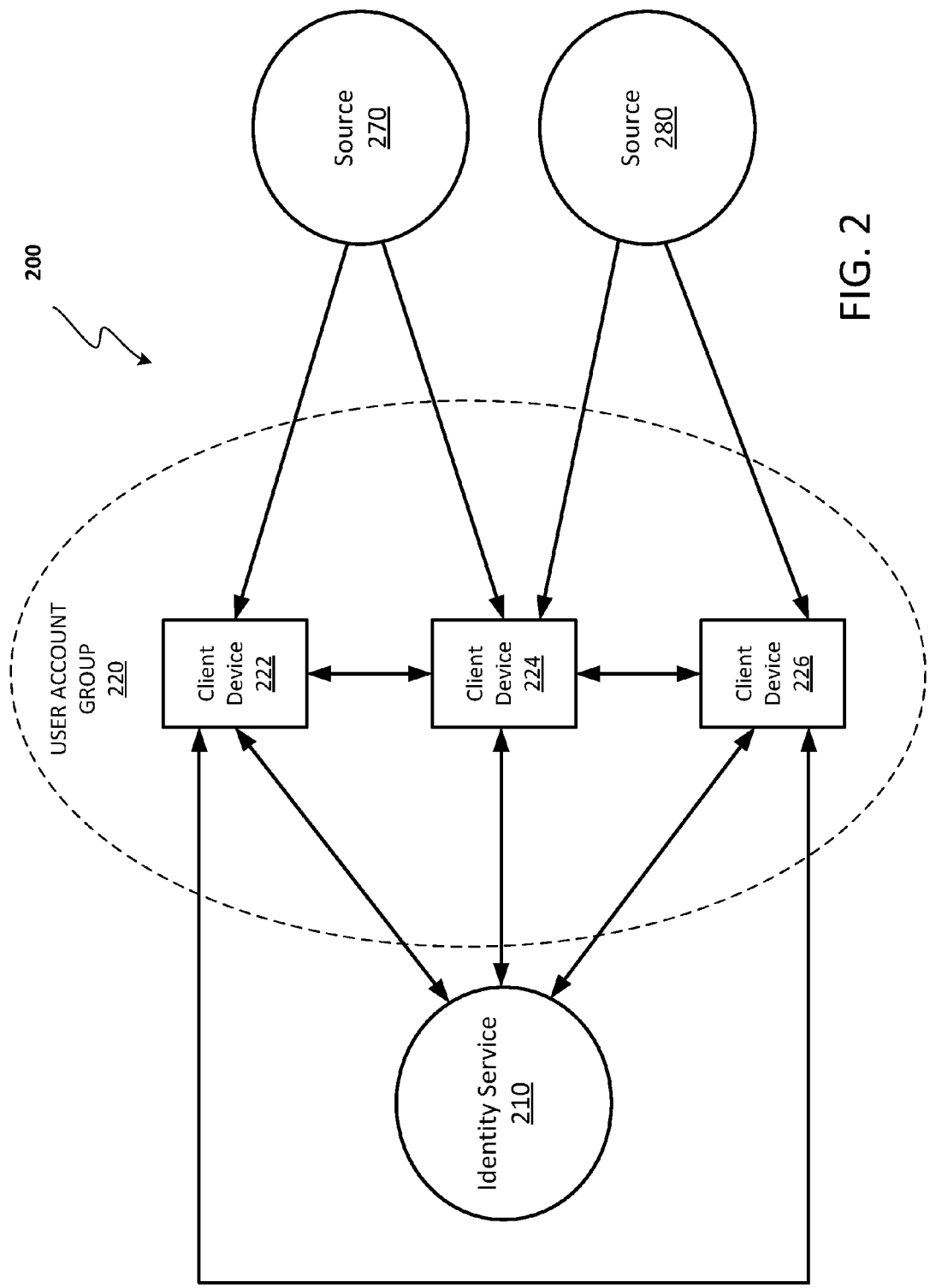
FIG. 2 illustrates an exemplary notification management system.

FIG. 2 illustrates an exemplary notification management system. System 200 includes identity service 210, user account group 220 (containing client devices 222, 224, and 226), source 270 and source 280. User account group 220 can be similar or substantially similar to user account group 100 in FIG. 1. Identity service 210 is configured to identify client devices that are associated with a handle (i.e., user account). When a handle corresponding to user account group 220 is part of a request from client device 222 to identity service 210, identity service 210 can return an identifier for each client device that is associated with user account group 220 (e.g., a unique identifier for client devices 222, 224, and 226). In some examples, the unique identifier of the requesting client device is also returned. The unique identifiers can be push tokens that persistently identify each client device. The unique identifiers can be used by the requesting client device to contact the other client devices in user account group 220.

Client device 222, 224, and 226 can store one or more notifications. Each notification can be generated by a source, such as source 270 and source 280. Depending on source settings, the source can generate and send notifications to one or more client devices that belong to a user account. For example, a service such as a social network application can specify one or more client devices that are to receive notifications. Thus, not all client devices of the handle (user account) may receive notifications from a given source. In this example, client device 222 and client device 224 are registered to receive notifications from source 270 while client device 224 and client device 226 are registered to receive notifications from source 280.

In some examples, source 270 can transmit a notification to client device 222 and an equivalent notification to client device 224. The notification and the equivalent notification can be independently generated by source 270. Notifications that are independently generated can lack a unique identifier to relate the notifications to one another. Thus, equivalent notifications can be uniquely generated and contain the same content. However, equivalent notifications are neither linked together, tied together, nor otherwise associated with one another. In other words, the equivalent notifications do not contain metadata linking one notification to the other. For example, the notifications sent to client device 222 and 224 from source 270 can be separately generated messages that contain the same content (i.e., equivalent notifications). Therefore while the content is the same, each notification is uniquely generated.

Figure 3:
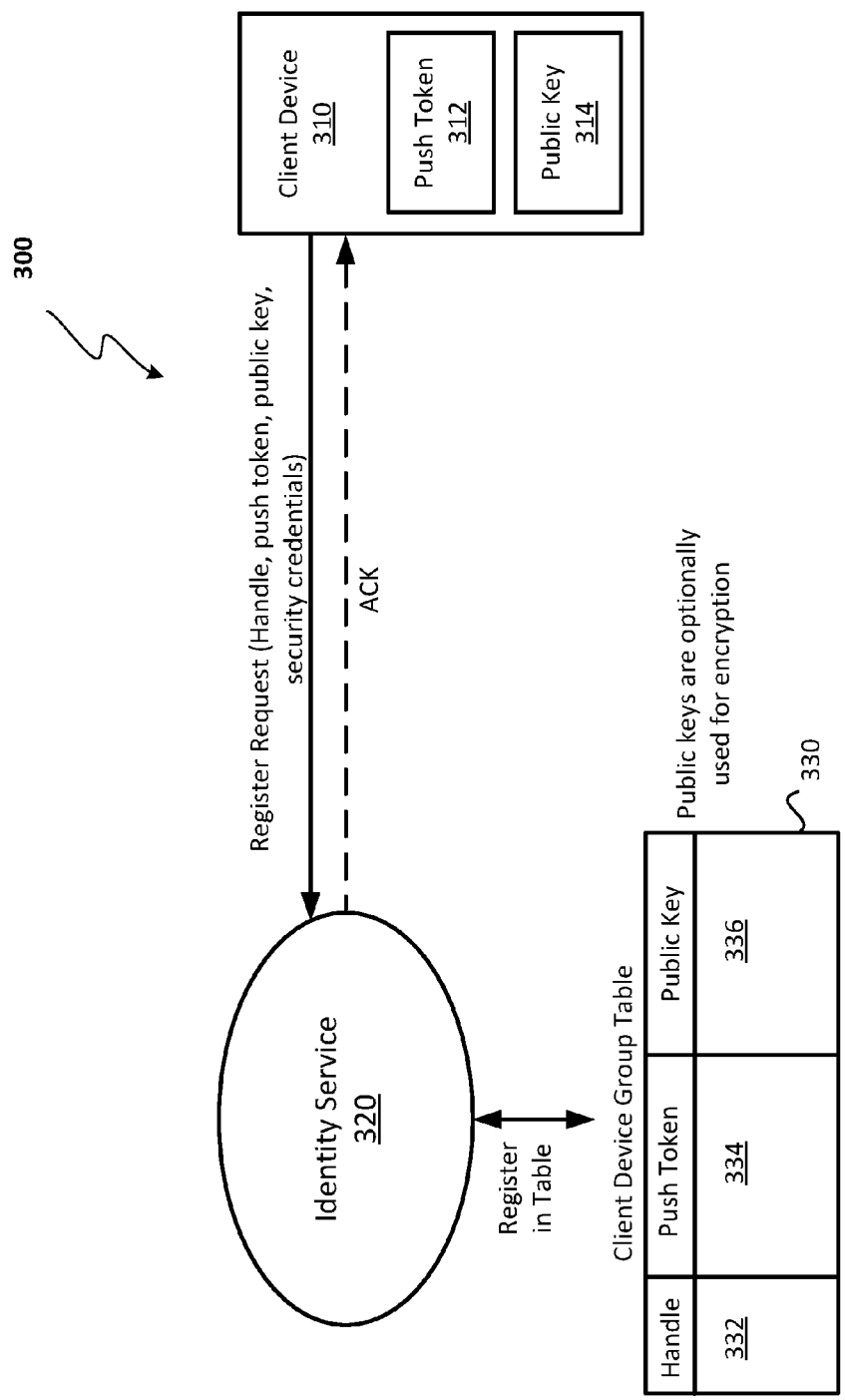
FIG. 3 illustrates an exemplary system for registering a client device.

FIG. 3 illustrates an exemplary system for registering a client device. System 300 includes client device 310, identity service 320, and client device group table 330. Client device 310 can include push token 312 and optionally public key 314. Push token 312 can be a persistent identifier that uniquely identifies client device 310 from other client devices. Unlike a device's IP address, the push token of a client device is long lived. Public key 314 can be an encryption key to encrypt communications to client device 310. Depending on implementation details, the system can optionally incorporate encryption.

Client device 310 can be in communication with identity service 320. In one embodiment, client device 310 transmits a register request to identity service 320. The register request can include a handle for identifying a user account of client device 310, a push token 312, a public key 314, and one or more security credentials. The handle can be a phone number, email address, userID, or other identifier that is associated with a particular user. Identity service 320 can receive the register request and verify the security credentials. Once the security credentials are verified, identity service 320 can register the client device in client device group table 330 by using the values in the register request. This can involve querying handle column 332 of client device group table 330 for the handle provided in the register request. If the handle exists, then this user has previously registered a client device and thus already has an entry in table 330. In this scenario, the entry associated with the handle is modified to include push token 312 in push token field 334 and public key 314 in public key field 336. If the handle does not exist, a new entry can be created in client device group table 330 which includes the handle, push token, and public key from the register request.

Once the client device is registered in client device group table 330, an acknowledgment can optionally be transmitted from the identity service 320 to client device 310 to notify the device that it has been successfully registered by the identity service.

Figure 4:
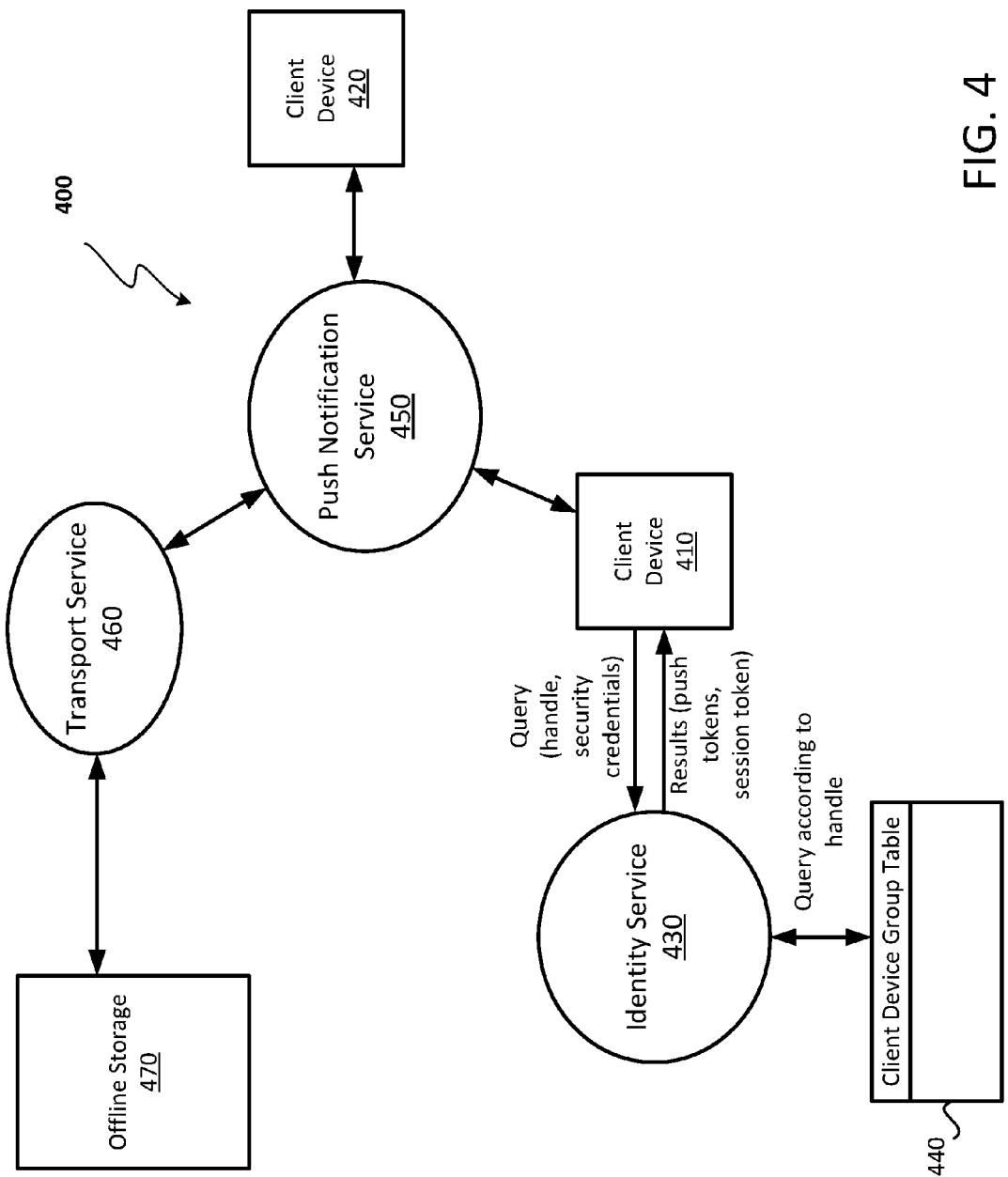
FIG. 4 illustrates an exemplary system for managing notifications.

FIG. 4 illustrates an exemplary system for managing notifications. System 400 includes client device 410, client device 420, identity service 430, client device group table 440, push notification service 450, transport service 460, and offline storage 470. System 400 can manage notifications of client device 410 and client device 420 such that a modified notification on one device can also apply to an equivalent notification on another device.

Client device 410 can be in communication with identity service 430. When a notification is modified in client device 410, an attempt can be made to perform the same modification on equivalent notifications stored in other client devices that belong to the user. This can improve the user experience by propagating a modification to a notification to equivalent notifications on other user devices, thus relieving the user from having to repetitiously perform the same modification on each notification. The attempt to perform the same modification can begin with client device 410 transmitting a query request to identity service 430 for push tokens (and optionally public keys) that are associated with a user account. The query can include a handle and security credentials. If the query is successful, identity service 430 can return results, which include push tokens (and optionally public keys) and a session token. The session token can be a token generated by identity service 430 that serves as a permission to communicate with other services of system 400. The session token can have a time to live (TTL) variable to ensure that communications based on the results of the query are to be performed within a predetermined period of time. For example, identity service 430 can generate a session token for modifying an equivalent notification on another client device. The session token can examine when communications are received by the push notification service 450, transport service 460, offline storage 470, client device 410, or client device 420. If the TTL has not expired on the session token, the incoming communications can be processed and acted upon. In some examples, the session token can be a signature that is generated from the source push token, target push token, time stamp, handle, or any combination of the above.

Identity service 430 can be configured to process registration requests and queries received from client devices. A registration request, as described above in FIG. 3, can register a client device as being associated to a particular handle. A query can identify client devices that are associated with a given handle. Identity service 430 can be in communication with client device group table 440 to store and retrieve push tokens and optionally public keys that are related to a given handle. Identity service 430 can also be configured to generate a session token.

Client device 410 can also be in communication with push notification service 450. Push notification service 450 can be configured to receive and route a silent notification received from client device 410. The silent notification can be generated in response to the results received from identity service 430. For each push token received from identity service 430 that isn't the push token of client device 410, client device 410 can generate a silent notification and transmit the notification through push notification service 450. The silent notification can include a target push token to identify the destination of the silent notification and a payload describing the change that has been performed to the notification. In other examples, other variables can also be included in the silent notification such as a source push token to identify the origin of the silent notification. The payload of the silent notification can be encrypted using a public key that is associated with the destination client device. By encrypting the payload with the public key, the access to the contents of the silent notification can be limited the destination client device. Therefore, the contents remain protected as the silent notification is routed to its destination. Moreover as shown in system 400, the public keys of the client devices are not managed by the services (push notification service 450 and transport service 460) for routing the silent notification from the source client device to the destination client device. This provides added security to the system since the routing services do not have access to the public keys.

Push notification service 450 can communicate with transport service 460. Transport service 460 can be configured to verify that the silent notification is authentic. This can include examining the session token to verify that the silent notification is within some TTL threshold. This can also include confirming that client device 410 can communicate with client device 420. Once the silent notification has been verified, push notification service 450 can route the silent notification to client device 420. In some examples, transport service 460 can be configured to perform operations based on the push tokens of the client devices. In contrast, push notification service 450 can include a push token to IP address mapping to route the silent notification to the IP address of the destination client device.

Transport service 460 is further in communication with offline storage 470. Offline storage 470 can be configured to store silent notifications that were unable to be delivered to the destination client device. This can be for various reasons, such as network/transmission error, loss of power at the destination client device, or the destination client device being offline. When push notification service 450 fails to deliver a silent notification to client device 420, the silent notification is transmitted to offline storage 470 for storage. At a future point in time when the presence of client device 420 can be detected, the silent notification can be retrieved from offline storage 470 and another attempt can be made to deliver the silent notification to client device 420. Attempts to deliver the silent notification are point to point communications between two client devices. Alternatively, the delivery attempts can be communicated through a push service.

Figure 5:
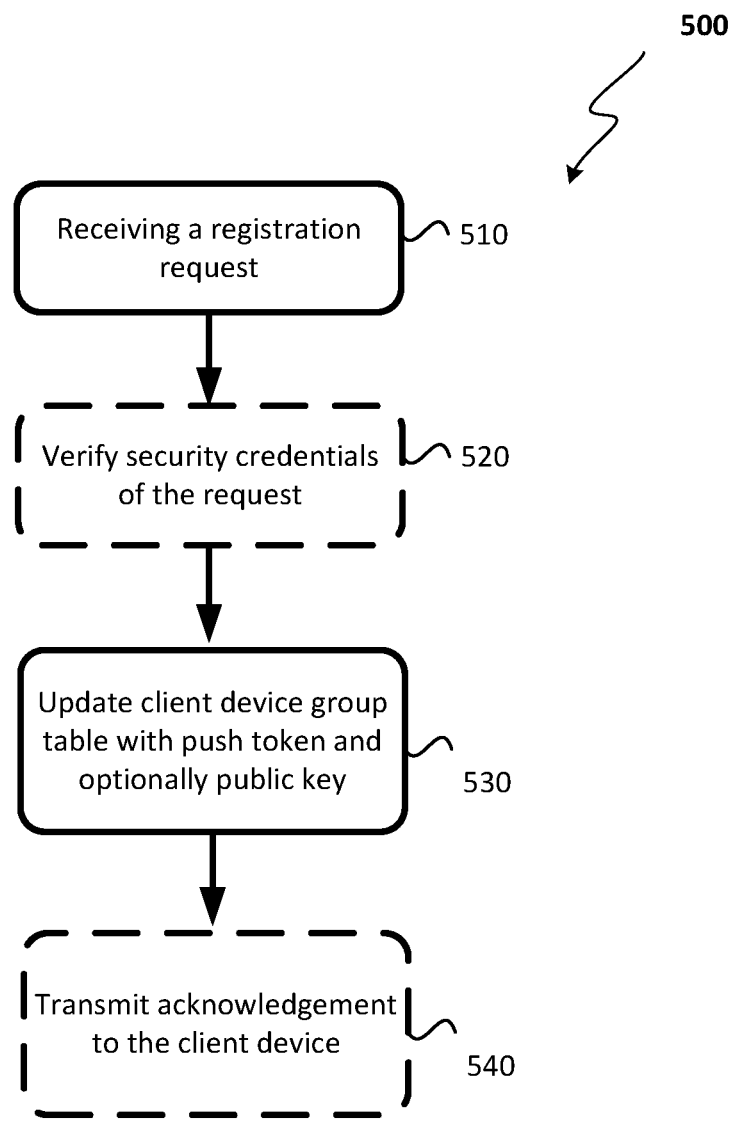
FIG. 5 illustrates an exemplary process to register a client device.

FIG. 5 illustrates an exemplary process to register a client device. Process 500 can be performed by a processor of an identity service. Process 500 begins by receiving a registration request at 510. In one example, a first client device broadcasts a request to a group of client devices that are associated with a user account. The group of client devices can each receive the request can in turn generate a registration request that is transmitted to an identity service. In another example, the registration request can be received from a single client device. The registration request can include data such as a handle, a push token and/or public key associated with a client device that transmitted the registration request, and security credentials for verifying the registration request. In some examples, a registration request can be generated by the client device in response to a user request. For example, the registration request can be generated in response to the selection of an icon on a user interface of a client device.

After receiving the registration request, process 500 can optionally verify security credentials of the request, if any, at 520. The security credentials can be present in the registration request. After verifying the security credentials, process 500 can proceed to update the client device group table according to the handle, push token, and optional public key at 530. Updating the table can include creating an entry for the handle if an entry does not exist or alternatively modifying an existing entry to include the push token and public key of the client device being registered. Once the client device group table has been updated, process 500 can optionally transmit an acknowledgment to the client device at 540. The acknowledgment can be configured to notify the client device that the registration was successful.

Figure 6:
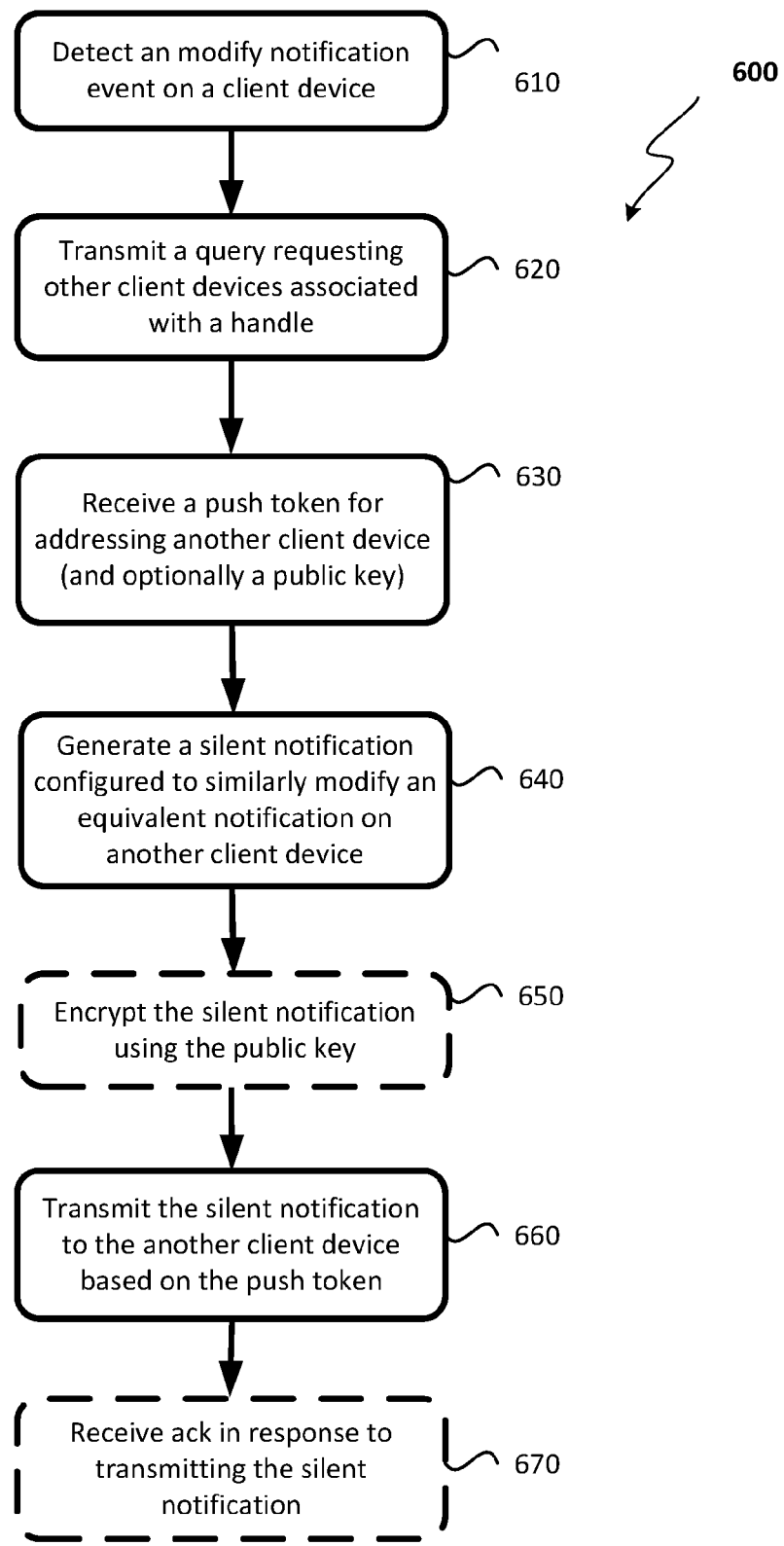
FIG. 6 illustrates an exemplary process to generate and transmit a silent notification.

FIG. 6 illustrates an exemplary process to generate and transmit a silent notification. Process 600 can be performed by a processor of a client device. Process 600 begins by detecting a modification event associated with a first notification on a client device at 610. The modification event is an event related to a request to modify the first notification. The modification to the notification can be to dismiss, delete, edit, or otherwise modify the notification stored on the client device. In one example, the event can be received by the client device. In another example, the event can be triggered via an application running on the client device. In yet another example, the event can be triggered from detecting a user interaction such as tapping, sliding, or otherwise communicating with a touch screen interface of a client device. In some examples, the user input can be detected while an alert of a notification is being presented on a display of the client device. Receiving the user input while the alert is being presented can imply that the user wishes to dismiss the alert. Alerts for the notification and equivalent notifications can be dismissed on the client device and other client devices.

After detecting the modification event, process 600 can transmit a query requesting other client devices associated with a handle at 620. The query request can be transmitted from the client device to an identity service that is configured to return metadata belonging to one or more client devices that are associated with a given handle. The handle submitted in the query request can be a user account or userID associated with the client device that detected the event. For example, a userID associated with the client device can be determined once the modification event has been detected. In some examples, the query request can include the handle and security credentials, if any, to confirm the query. In response to the query request, process 600 can receive a push token for addressing another client device at 630. The push token can persistently and uniquely identify another client device. In some examples, a public key that is used to encrypt communications to another client device can also be received. With the received metadata (push token and optional public key), the processor has sufficient information to generate a silent notification for transmission to another client device. In other examples, metadata belonging to the other client devices associated with a handle can be cached locally, thus avoiding the need to transmit a query request for the metadata.

Process 600 can continue by generating a silent notification configured to similarly modify an equivalent notification on another client device at 640. The silent notification can include a payload with instructions to modify an equivalent notification on another client device in the same manner as the event detected in 610. The instructions can include a flag or key that is used to specify a desired degree of modification. For example, the desired degree can be to modify an alert of the notification or to modify the notification itself in a notification center of the client device. For instance, if an event was detected to dismiss an alert for a particular social media notification from a lock screen of a device, the payload can include instructions to also dismiss an alert for a similar social media notification if it exists on a lock screen of another device. The instructions can also be structured in a plurality of fields. A sectionID field can contain a string specifying the notification provider that generated the notification (i.e., source of the notification). A feed field can contain an integer value that specifies how to modify the notifications on the receiving device. For example, an integer value of zero may specify to delete the notification from the notification center while an integer value of one may specify to dismiss the notification from a lock screen of the device. Notifications field can include a collection of items describing which notifications to modify. Each item can contain a time stamp indicating when the notification was created and a hash of the notification's title, subtitle, and contents. The time stamp and the hash can be used to match notifications on the receiving device. Alternatively, an identifier specified by the notification source can be used to uniquely identify the notification. By allowing a collection of items to be stored, multiple modifications can be modified at once. For instance, an instruction to clear a particular section in the notification center can clear all notifications contained in that section. In some examples, the payload of the silent notification can be encrypted using a public key to protect the payload of the silent notification before it is received by the destination client device.

Once the silent notification has been generated, process 600 can transmit the silent notification to another client device based on the push token at 660. Transmitting the silent notification can include routing the silent notification through a push notification service and transport service. Transmitting the silent notification can also include storing the silent notification when another client device is not available to receive the silent notification. In some examples, an optional acknowledgment can be received in response to transmitting the silent notification at 670. The acknowledgment can inform process 600 whether the silent notification has been received by another client device.

Figure 7:
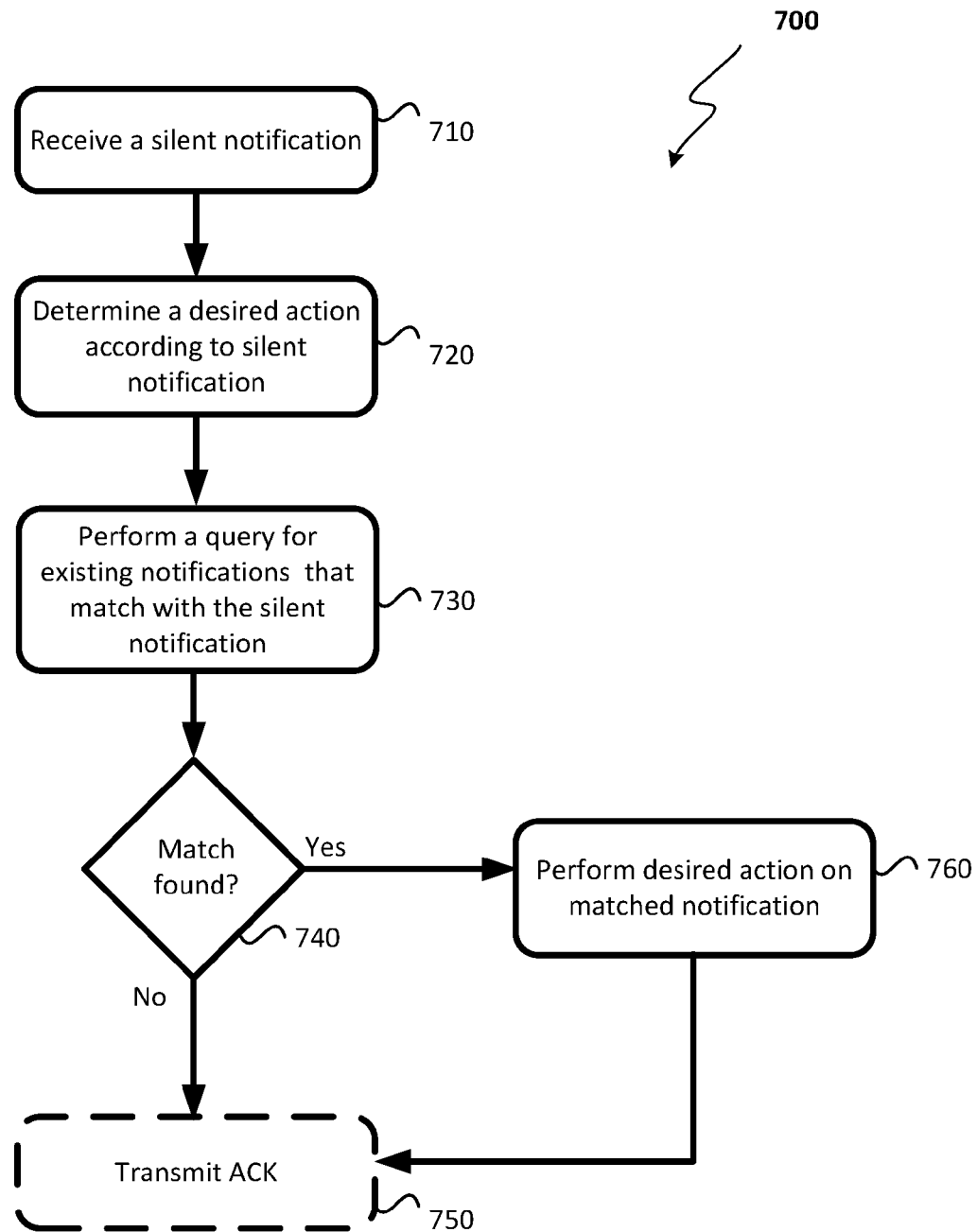
FIG. 7 illustrates an exemplary process to receive and process a silent notification.

FIG. 7 illustrates an exemplary process to receive and process a silent notification. Process 700 can be performed by a client device. In some examples, a client device can be configured to perform both the processes of FIG. 6 and FIG. 7. Depending on whether the client device is generating and transmitting a silent notification or receiving and processing a silent notification, a different process can be performed. Process 700 can begin by receiving a silent notification at 710. A client device can receive a silent notification from another client device via point to point communications or a push service. Process 700 can then determine a desired action according to the silent notification at 720. The desired action can be to delete a notification, dismiss an alert of a notification, modify a notification, or other.

After the desired action is determined, process 700 can perform a query for existing notifications that match with the silent notification at 730. This can include comparing the content of the silent notification to the content of the existing notifications stored on the client device. Comparing the silent notification to existing notifications can include matching the content or attributes of the notifications in search for an equivalent notification. In one example, each notification is unique and thus a unique identifier may not exist to match the silent notification to existing notifications. For instance, a third party source can transmit a notification to a first client device to notify the user that an article is available in a news application of the first client device. The third party source can also transmit an equivalent notification to a second client device to also notify the user that the article is available in the same news application installed on the second client device. Since the notifications are unique, matching can be performed using other techniques such as text matching to determine whether a match exists.

In one example, the content of the silent notification can be matched to the content of existing notifications. If a match is found in the content, the existing notification is identified as matching the silent notification. The matching can include text matching to determine whether the same sentence or words are present in both notifications. In other words, the content can be matched. In other examples, other parameters can be used to match notifications. For example, the type of the notification can be matched. For instance if the silent notification is related to a given application, only existing notifications that are also related to the given application are considered as candidates for matching. Notifications that are not related to the given application are skipped during the matching. In yet other examples, other variables such as the size of the content can be used to determine whether a match is found. For instance, two notifications can be identified as being a match if a checksum generated from the content of the notifications is the same. In another embodiment, a hash of properties from the silent notification can be used to match existing notifications. One or more of the silent notification's title, subtitle, and contents (both payload and details related to the source or destination of the notification) can be used to generate a hash that can be matched against a similarly generated hash for existing notifications. In one example, a time delta can be applied to the time stamp of the silent notification to create a temporal window. The temporal window can be applied to the existing notification to create a subset of notifications that potentially match the silent notification. A hash value can be generated for each notification in the subset and matched against the hash value of the silent notification. In yet other examples, different matching techniques can be applied based on the information available from the silent notification. For instance, a unique identifier of the silent notification can be matched against a unique identifier of existing notifications when the unique identifier is set. If the unique identifier is not set, a hash value can be generated from the properties of the silent notification to perform hash matching as described above.

If a match is found at 740, the desired action is performed on the matched notification at 760. An acknowledgment can optionally be transmitted to the sender of the silent notification at 750. Alternatively if a match is not found at 740, the desired action can be skipped and an acknowledgment can optionally be transmitted to the sender of the silent notification at 750. In some examples, the acknowledgment can inform the sender whether the silent notification was received, whether a match was found, and/or whether the desired action was performed on an existing notification of the client device.

Figure 8:
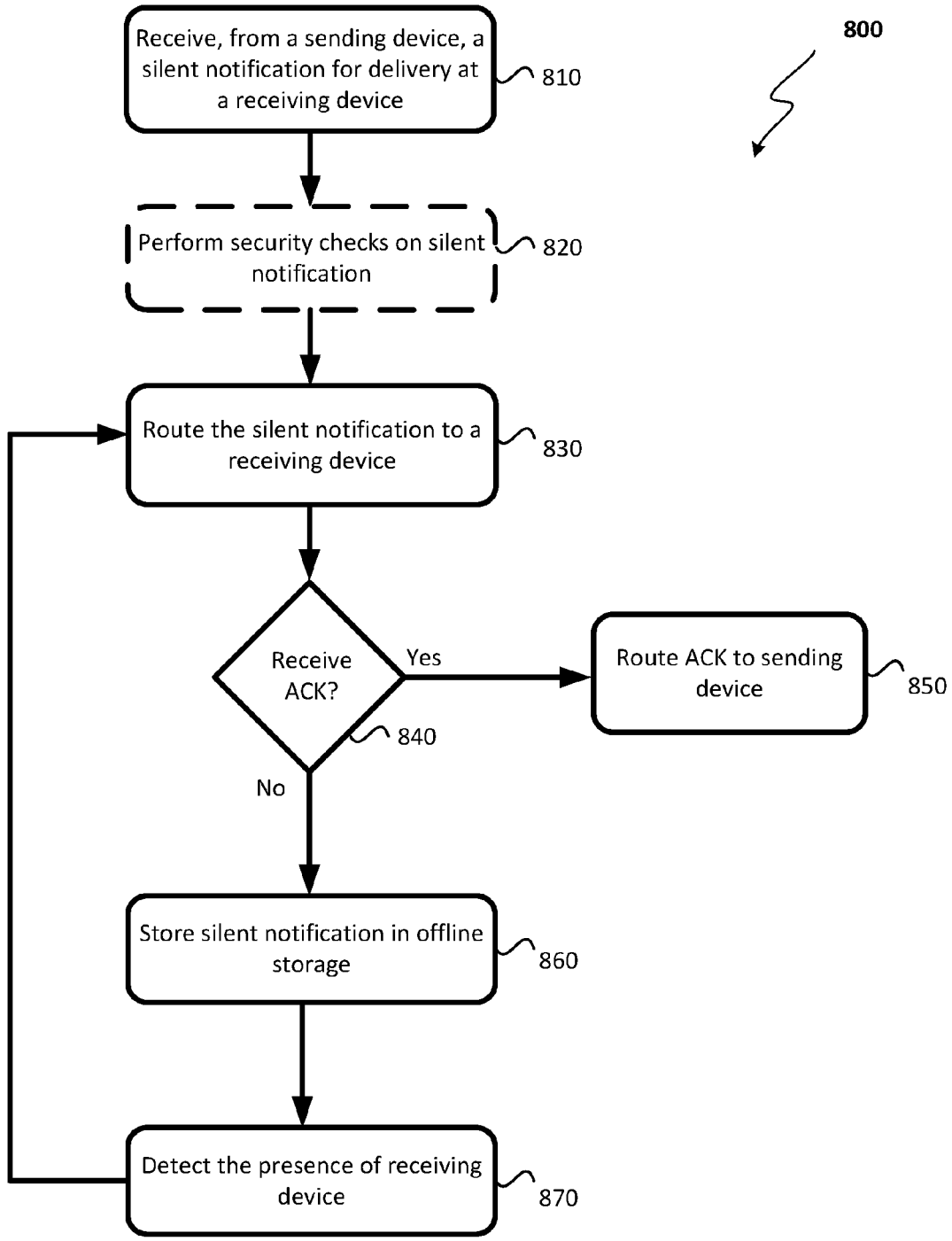
FIG. 8 illustrates an exemplary process to transmit a silent notification from a sending device to a receiving device.

FIG. 8 illustrates an exemplary process to transmit a silent notification from a sending device to a receiving device. Process 800 can be performed by a processor of a push notification service. Process 800 can begin by receiving, from a sending device, a silent notification for delivery at a receiving device at 810. The silent notification can be received with push tokens to identify the sending device and the receiving device. After the silent notification is received, process 800 can optionally perform security checks on the silent notification at 820. Security checks can be performed to ensure that the silent notification is sent from a trusted client device. The security checks can include evaluating a time stamp from a session token of the silent notification to ensure that the silent notification is being transmitted within a TTL associated with the session token. The TTL can provide a window in which the silent notification is to be generated and transmitted to the receiving client device. If the session token has expired, then the silent notification is discarded.

Once the security checks have been performed, process 800 can route the silent notification to the receiving device at 830. Routing the silent notification can include transmitting the silent notification to a series of network hubs to route the silent notification to the receiving device. Routing the silent notification can also include converting the persistent push token of the receiving device to a current IP address of the receiving device. After routing the silent notification to the receiving device, process 800 can wait for a predefined period of time to receive an acknowledgment at

840. If an acknowledgment is received, the acknowledgment is routed to the sending device at 850. Alternatively if the acknowledgment is not received at 840, the silent notification can be stored in offline storage at 860. Process 800 can wait a predefined period of time for the acknowledgement to arrive before determining that the acknowledgment is not received. The offline storage stores the silent notification temporarily until a later point in time when another attempt can be made to route the silent notification to the receiving device. Once the offline storage has stored the silent notification, process 800 can wait to detect the presence of the receiving device at 870. Detecting the presence can include waiting for a ping from the receiving device or waiting for another signal from the receiving device. Once the presence is detected, process 800 can attempt again to route the silent notification to the receiving device at 830. This loop can be repeated until an acknowledgment is received from the sending device.

Figure 9:
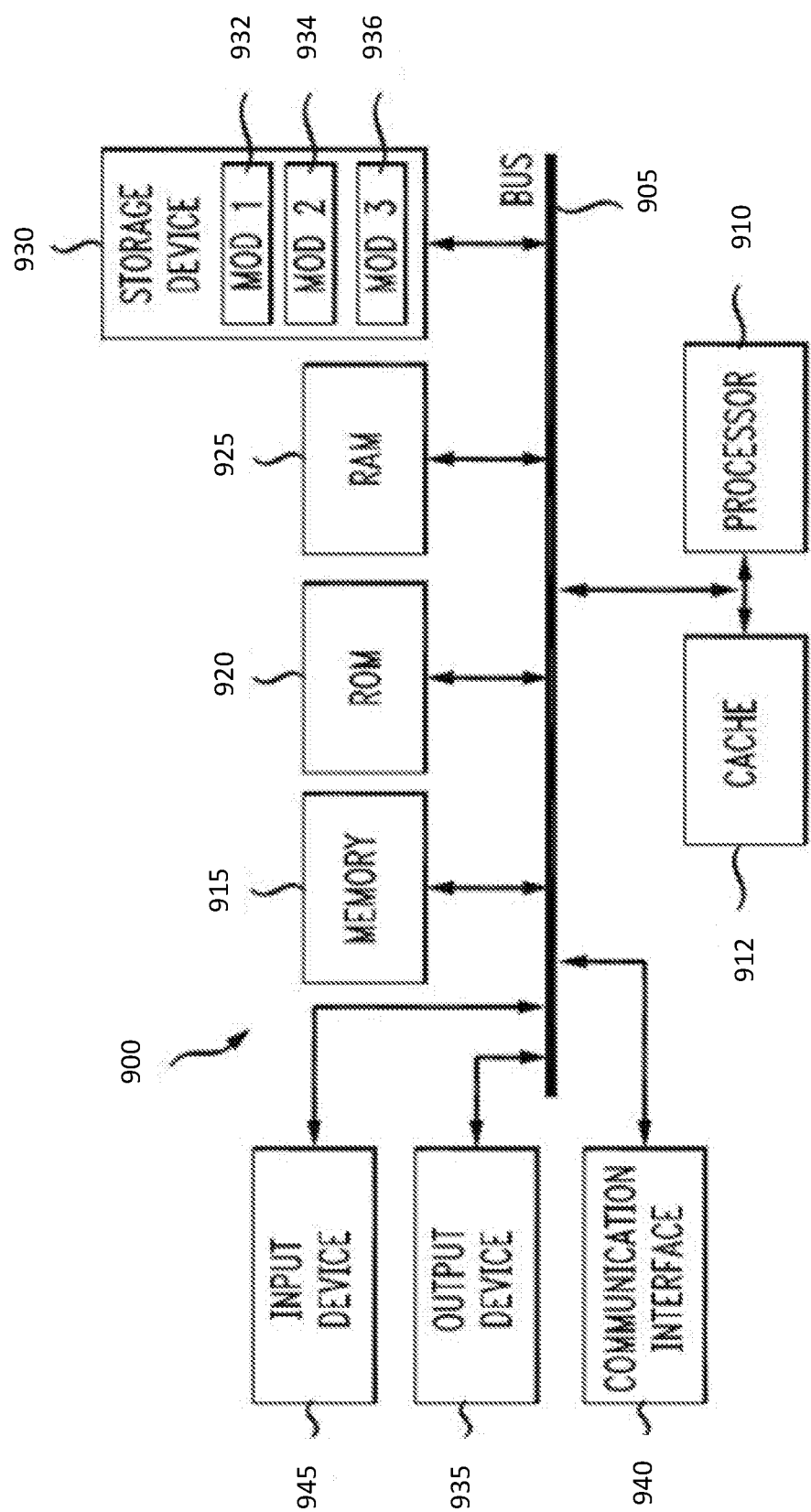
FIG. 9 illustrates a conventional system bus computing system architecture.
Figure 10:
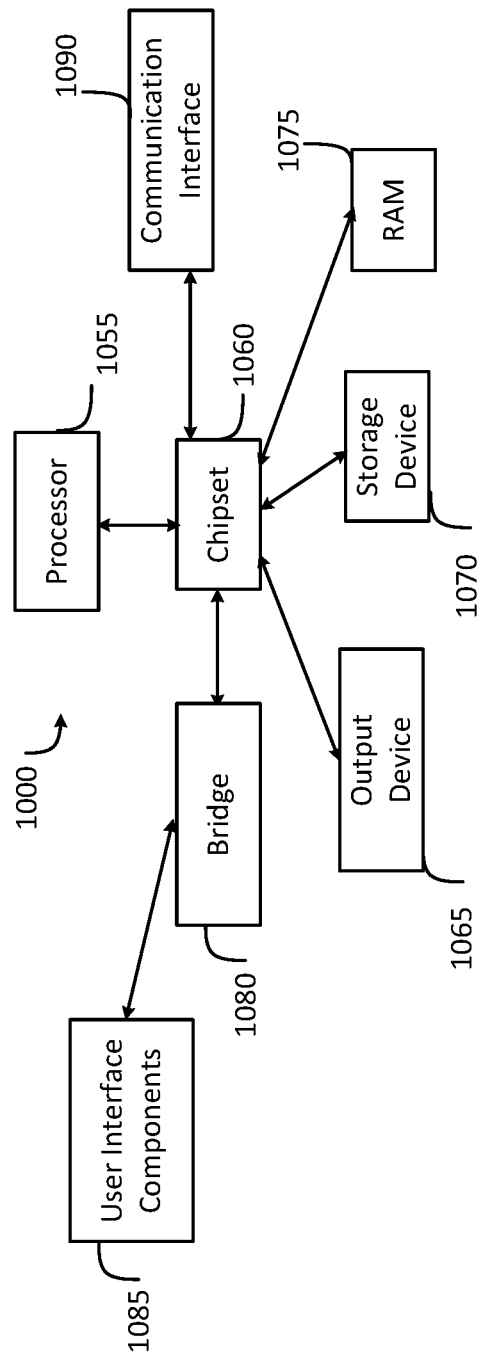
FIG. 10 illustrates a computer system 1000 having a chipset architecture that can be used in executing the described method and generating and displaying a graphical user interface (GUI).

FIG. 9 and FIG. 10 illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 9 illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 10 illustrates a computer system 1000 having a chipset architecture that can be used in executing the described method and generating and displaying a graphical user interface (GUI). Computer system 1000 is an example of computer hardware, software, and firmware that can be used to implement the disclosed technology. System 1000 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 900 and 1000 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method, comprising:
   detecting, on a first client device, a modification event associated with a first notification on the first client device;
   determining a handle associated with the first client device;
   transmitting, to an identity service, a request for a second client device associated with the handle;
   receiving a token for addressing the second client device associated with the handle;
   generating a notification having instructions to modify another notification on the second client device; and
   transmitting, through a notification service, the notification from the first client device to the second client device, according to the token.

2. The computer implemented method of claim 1, further comprising:
   receiving a public key representing an encryption scheme of the second client device; and
   encrypting, prior to transmission, content of the notification according to the public key.

3. The computer implemented method of claim 1, wherein the first notification and the second notification are generated from a remote source.

4. The computer implemented method of claim 1, wherein the modification event is a request to dismiss an alert from a lock screen of the first client device.

5. The computer implemented method of claim 1, wherein the modification event is a request to remove the first notification from a notification center of the first client device.

6. The computer implemented method of claim 1, wherein the modification to the second notification is the same as the modification to the first notification.

7. The computer implemented method of claim 1, wherein the notification includes content from the first notification.

8. A system comprising:
   one or more processors;
   memory storing instructions, which when executed by the one or more processors, causes the one or more processors to perform operations comprising:
      detecting, on a first client device, a modification event associated with a first notification on the first client device;
      determining a handle associated with the first client device;
      transmitting, to an identity service, a request for a second client device associated with the handle;
      receiving a token for addressing the second client device associated with the handle;
      generating a notification having instructions to modify another notification on the second client device; and
      transmitting, through a notification service, the notification from the first client device to the second client device, according to the token.

9. The system of claim 8, further comprising:
   receiving a public key representing an encryption scheme of the second client device; and
   encrypting, prior to transmission, content of the notification according to the public key.

10. The system of claim 8, wherein the first notification and the second notification are generated from a remote source.

11. The system of claim 8, wherein the modification event is a request to dismiss an alert from a lock screen of the first client device.

12. The system of claim 8, wherein the modification event is a request to remove the first notification from a notification center of the first client device.

13. The system of claim 8, wherein the modification to the second notification is the same as the modification to the first notification.

14. The system of claim 8, wherein the notification includes content from the first notification.

15. A method comprising:
   receiving, by a first client device, a first notification initiated by a second client device, the first notification including instructions to modify a second notification of the first client device, the first client device and the second client device associated by a handle; matching first content of the first notification with second content of a plurality of notifications of the first client device;

identifying the second notification for modification based on the matching; and modifying, by the first client device, the second notification of the first client device according to the instructions.

16. The method of claim 15, wherein the handle identifies a group of client devices associated with a user account that includes the first client device and the second client device.

17. A system comprising:

one or more processors;

memory storing instructions, which when executed by the one or more processors, causes the one or more processors to perform operations comprising:

receiving, by a first client device, a first notification initiated by a second client device, the first notification including instructions to modify a second notification of the first client device, the first client device and the second client device associated by a handle;

matching, by the first client device, first content of the first notification with second content of a plurality of notifications of the first client device;

identifying, by the first client device, the second notification for modification based on the matching; and modifying, by the first client device, the second notification of the first client device according to the instructions.

18. The system of claim 17, wherein the handle identifies a group of client devices associated with a user account that includes the first device and the second client device.

* * * * *